(12) United States Patent
Arnold

(10) Patent No.: US 6,275,848 B1
(45) Date of Patent: *Aug. 14, 2001

(54) METHOD AND APPARATUS FOR AUTOMATED REFERENCING OF ELECTRONIC INFORMATION

(75) Inventor: Gordon K. Arnold, Malvern, PA (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,022

(22) Filed: May 21, 1997

(51) Int. Cl.$^7$ ...................................................... G06F 15/16
(52) U.S. Cl. ............... 709/206; 395/200.33; 395/200.35; 395/200.48; 395/200.57; 395/200.62; 395/200.66; 395/200.49
(58) Field of Search .................... 395/200.33, 200.35, 395/200.48, 200.57, 200.62, 200.66, 200.49; 709/200, 206, 218, 232, 238, 239, 207, 217; 713/201

(56) References Cited

U.S. PATENT DOCUMENTS

| | | |
|---|---|---|
| 5,418,908 | 5/1995 | Keller et al. . |
| 5,553,281 | 9/1996 | Brown et al. . |
| 5,572,643 | 11/1996 | Judson . |
| 5,717,742 * | 2/1998 | Hyde-Thomson ................. 397/88.17 |
| 5,781,901 * | 7/1998 | Kuzma .................................... 707/10 |
| 5,832,208 * | 11/1998 | Chen et al. .......................... 713/201 |
| 5,835,712 * | 11/1998 | DuFresne ........................ 395/200.33 |
| 5,867,665 * | 2/1999 | Butman et al. ....................... 709/239 |

OTHER PUBLICATIONS

Notess, Greg R., Sending and receiving email attachments, Online; Wilton; Mar./Apr. 1997, vol. 21, pp. 85–87.*

M. Bjorn et al., "An HTTP Gateway For Interactive Relational Database Query With Deferred Reply," IEICE Transactions On Information and Systems, vol. E78–D, No. 11, (Abstract).

* cited by examiner

Primary Examiner—Dung C. Dinh
Assistant Examiner—Bradley Edelman
(74) Attorney, Agent, or Firm—Hunton & Williams

(57) ABSTRACT

An apparatus and method for automated referencing of electronic information is disclosed. The apparatus for automated referencing of electronic information comprises means for receiving a message, the message having at least one attachment; means for applying detachment rules to the message, the detachment rules including criteria for detachment; and means for sending the message to at least one recipient. The method for automated referencing of electronic information comprises the steps of: (1) receiving a message, the message having at least one attachment; (2) applying detachment rules to the message, the detachment rules including criteria for detachment; (3) sending the message to at least one recipient; and if the detachment rules determine that the attachment should be attached, (4) detaching the attachment; (5) placing the attachment on a remote site; and (6) inserting a pointer into the message, wherein the pointer is linked to the remote site.

19 Claims, 4 Drawing Sheets

METHOD AND APPARATUS FOR AUTOMATED REFERENCING OF ELECTRONIC INFORMATION

BACKGROUND OF THE INVENTION

1. Field of the Invention

The present invention relates generally to the field of information processing and more particularly relates to a method and apparatus for automated referencing of electronic information.

2. Description of the Background

Electronic messaging has become an important part of business, governmental, educational and personal communication. Users on remote computers may communicate with each other by exchanging electronic mail (e-mail). Most e-mail messages are sent in plain text format called American Standard Code for Information Interchange (ASCII). ASCII standardizes the information an e-mail program needs in order to send the basic alphabet, punctuation and certain additional characters. The data of an e-mail message is easier to send and receive when there is no format information, such as fonts, colors, italics, and tables. Most e-mail systems can handle plain text transfer without difficulties.

For users who want to send documents, spread sheets, graphic images, sound files, executable programs or other non-text data formats, they must overcome the text only character format limitations of ASCII. Typically, users attempt to accomplish this by sending the formatted documents as attachments to e-mail messages rather than placing the data within the body of the message. When a user attaches a file to an e-mail message, an encoding scheme in the user's e-mail program converts the file to ASCII format When the e-mail arrives at its destination, the recipient's e-mail package converts the attachment back into its original format.

Sharing attachments across different e-mail platforms is problematic. For example, problems arise when a recipient is sent an attached file for a software package he does not have, compressed in a format that cannot be decompressed, or encoded in a way that cannot be decoded. Also, not every Simple Mail Transfer Protocol (SMTP) gateway can reliably handle multiple or large attachments. Different mail systems may have various character limits for the body of the text, which may cause the loss of attachment if it is too large. Similarly, the sending of more than one attached file may result in the loss of one or all of the attachments. Further, the encoding and decoding processes used in transferring the message may mangle or truncate the attachment. Or, the message may remain encoded in the body of the text, making it unreadable unless decoded manually. In sum, different platforms, e-mail programs, gateways and encoding methods make the sending of e-mail attachments a questionable and unpredictable means of electronic communication.

Such difficulties in the transfer of attachments may extend beyond the single e-mail message sent. Indeed, the operability of the entire e-mail system may be affected. For example, one unreadable attachment may cause a recipient's e-mail application to crash.

In addition to sharing information via attachments, information is also shared through access to corporate intranets and the Internet. Typically, a user "pulls" information, often complete Hypertext Markup Language (HTML) pages, to a Web browser from an external Web server or an intranet. This pulling of information expends a great amount of network bandwidth and requires the user to engage in time-consuming and time-wasting searches for information. Alternatively, "push"-oriented or broadcast technology may be used. Under push technology, a central location on a server gathers information, matches it to a user's needs and automatically sends it to the user as desired or needed. Push technology suffers from many shortcomings, including overloading networks by pushing too much data at peak times, causing network shutdowns due to unsuitable network configurations, transmitting a limited amount of information because of insufficient management tools and causing information overload.

Therefore, a need has arisen for a new method and apparatus for automated referencing of electronic information that overcomes the disadvantages and deficiencies over the prior art.

SUMMARY OF THE INVENTION

An apparatus for automated referencing of electronic information is disclosed. The apparatus for automated referencing of electronic information comprises means for receiving a message, the message having at least one attachment; means for applying detachment rules to the message, the detachment rules including criteria for detachment; and means for sending the message to at least one recipient.

In another embodiment, a method for automated referencing of electronic information in accordance with the invention comprises six steps. These steps are: (1) receiving a message, the message having at least one attachment; (2) applying detachment rules to the message, the detachment rules including criteria for detachment; (3) sending the message to at least one recipient; and if the detachment rules determine that the attachment should be attached, (4) detaching the attachment; (5) placing the attachment on a remote site; and (6) inserting a pointer into the message, wherein the pointer is linked to the remote site.

A technical advantage of the present invention is that a method and apparatus for automated referencing and sharing of electronic information is provided.

Another technical advantage is that the invention provides an automated messaging referencing system which applies a set of rules that determine whether an attachment should be detached from an electronic message, placed on a remote site and replaced with a pointer. The pointer identifies and links to the remotely located attachment. The remote location may be a site on an intranet or the Internet. Recipients of the electronic message may access the attachment by enabling the pointer.

Another technical advantage of the invention is that it provides an electronic messaging system that uses a combination of push and pull technologies. This hybrid push and pull system efficiently manages the transfer and sharing of information among a plurality of users.

Another technical advantage is that the invention manages access to a remotely located attachment through use of an attachment access list. Only those individuals or entities named on the access list may have access to the attachment. Preferably only the recipients of the e-mail message are listed on the access list.

Another technical advantage is that the invention controls the transfer flow of documents across a network. If a document is designated as confidential, or otherwise has content-driven restrictions on the community of intended recipients, then the delivery of such document may be blocked. The criteria for controlling such transfer flow is configurable to meet the preferences and needs of the administrator or user.

Another technical advantage is that the invention provides a work flow arrangement which allows recipients of an electronic message to access, edit and save new versions of remotely located attachments referenced to in the message. This provides a multi-party electronic information system that resembles real world sharing of information.

Other objects, advantages and embodiments of the invention are set forth in part in the description which follows, and in part will be apparent from this description or may be learned from practice of the invention.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE PREFERRED EMBODIMENTS

The preferred embodiment of the present invention and its advantages are best understood by referring to FIGS. 1 through 4 of the drawings, like numerals being used for like and corresponding parts of the various drawings.

Figure 1:
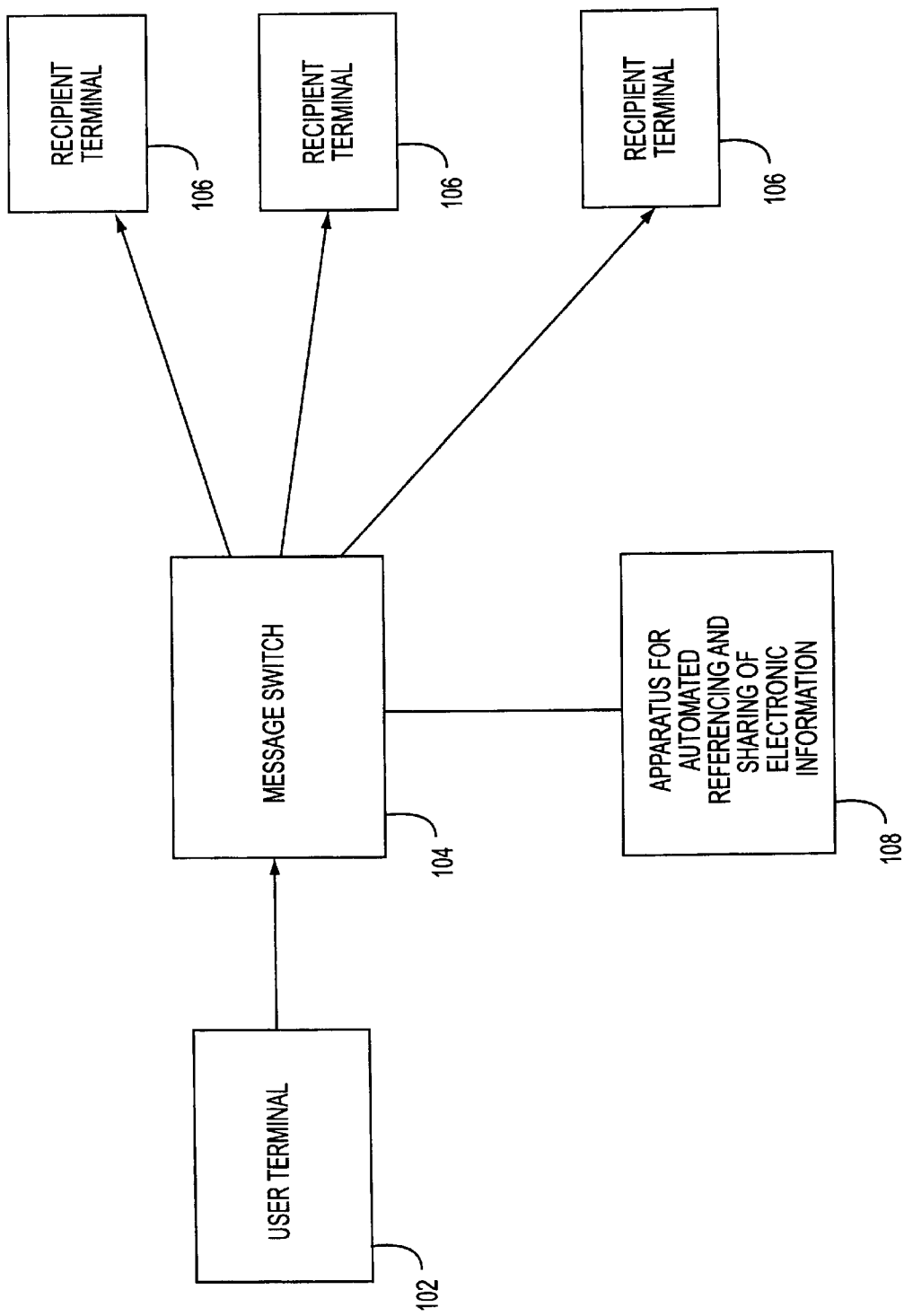
FIG. 1 shows the topology of a preferred embodiment of the invention.

The topology of a preferred embodiment of the invention is shown in FIG. 1. A user, through a user terminal 102, sends an electronic message to a plurality of recipient terminals 106. The user and recipients of the message may be located on the same e-mail platform or on different platforms. The message switch 104 transports the electronic message from the user to the recipients. The message switch 104 employs an apparatus for automated referencing and sharing of electronic information 108. The apparatus 108 enforces a messaging etiquette by applying predetermined criteria to determine whether an attachment to an electronic message should be detached.

If certain predetermined criteria are met, the attachment is placed in a remote location which can be accessed by the recipients of the e-mail message. The remote location may be a site on an intranet, the Internet or other network. Preferably, the attachment is located on a Web server.

Rather than providing the attachment simultaneously with an e-mail message, the apparatus 108 creates a pointer in the text of the e-mail message which directs the recipients to the appropriate Web site. The pointer may be a Uniform Resource Locator (URL), which automatically calls the Web site. Access to the remotely-located attachment is controlled by an access list or other similar means for defining access rights. Preferably, only those recipients of the e-mail message have access to the Web site, and no other party has access rights to the attachment. Because the attachments are not sent along with the e-mail message, there is no risk of sending recipients unreadable, truncated or lost attachments. Moreover, the present invention prevents e-mail system crashes and other undesirable effects of sending attachments simultaneously with e-mail messages, thereby providing a quicker and more stable e-mail system.

Figure 2:
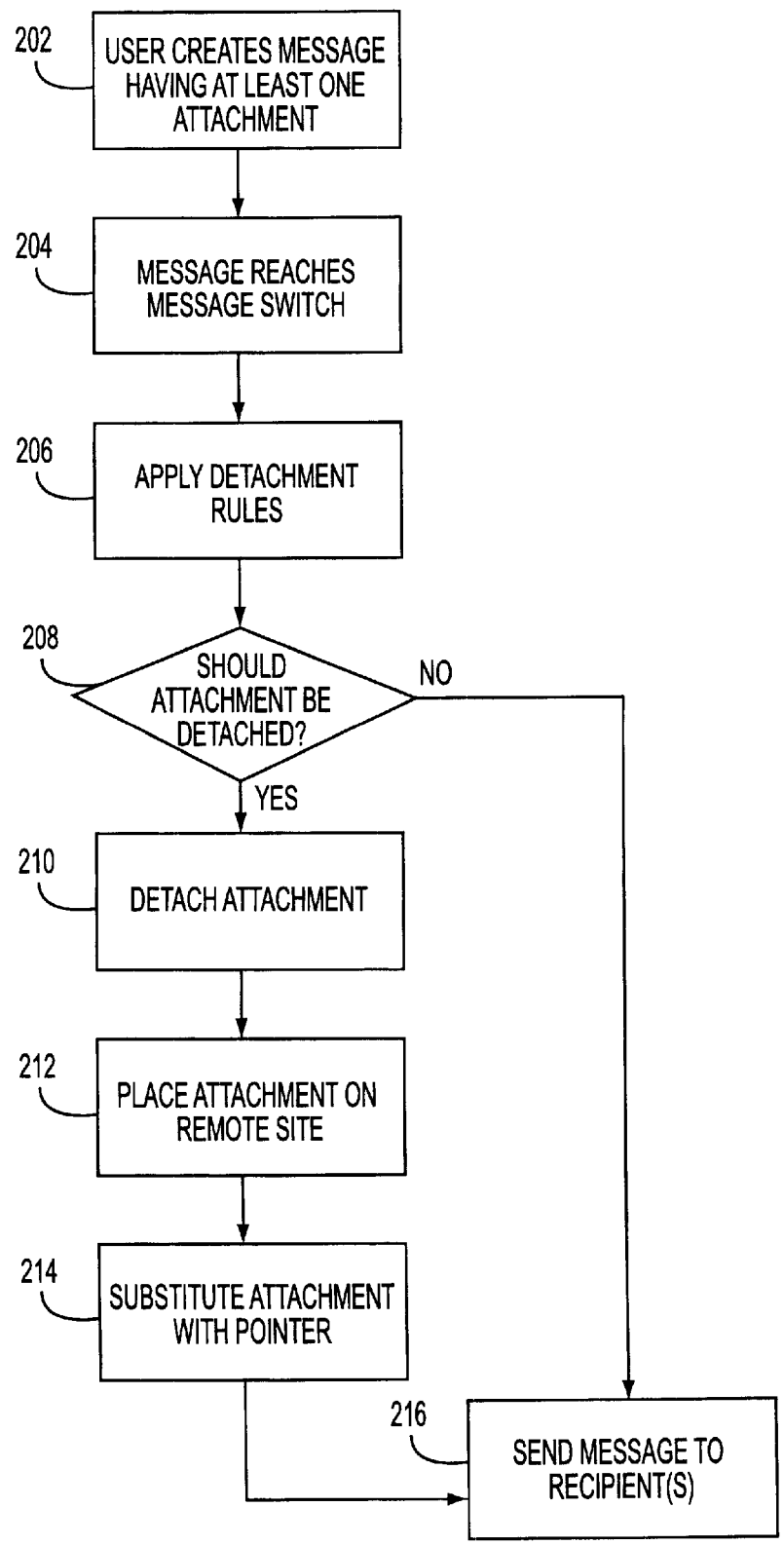
FIG. 2 is a flow chart diagram depicting the steps of sending an e-mail message according to a preferred embodiment of the invention.
Figure 3:
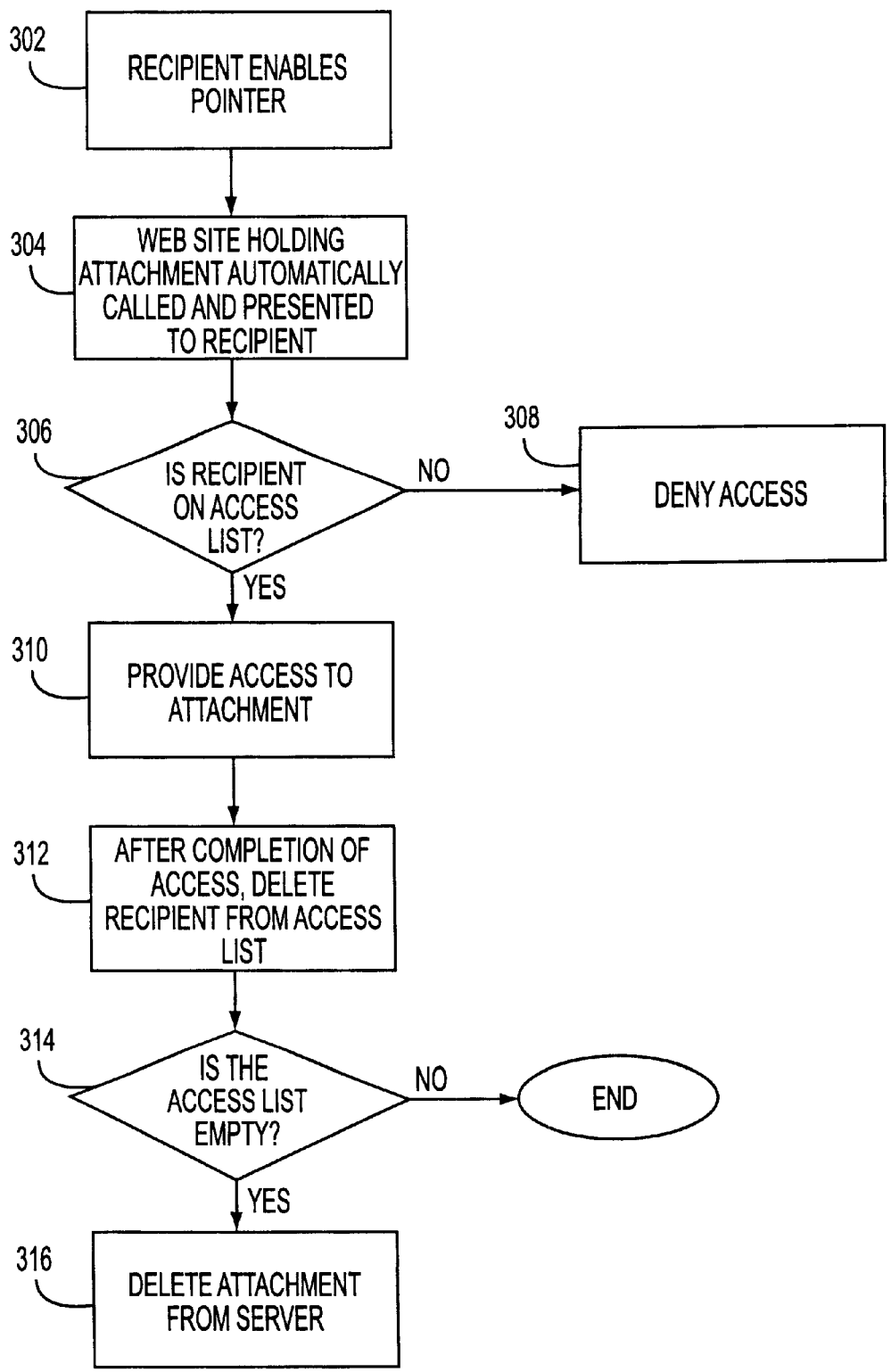
FIG. 3 is a flow chart diagram depicting the steps of accessing a remotely-located attachment according to a preferred embodiment of the invention.

The steps of a preferred embodiment of the invention are illustrated in FIG. 2. The user first creates an e-mail message with at least one attachment 202. The message reaches the message switch 204. The message switch, through the apparatus for automated messaging referencing and sharing of electronic information, applies detachment rules to the e-mail message 206. The detachment rules include criteria for determining whether or not the attachment should be detached from the message 208, thereby enforcing a messaging etiquette. The criteria may include message size, number of recipients, type of recipient (e.g., mobile), where the recipient is located and other configurable factors. The detachment rules are automatically applied to preferably every message entering the switch. An attachment meeting certain criteria (e.g., message size, number of recipients, etc.) is automatically detached 210, placed on a remote site 212, preferably a Web server, and substituted with a pointer to the Web server 214. This is all transparent to the user. The message is then sent to the recipient(s) 216.

Access to the attachment is controlled by an access list. Only those individuals included on the access list may access the attachment. Preferably only the recipients of the e-mail message will be listed on the access list. Each recipient who is on the access list preferably has read only access to the attachment. As illustrated in the flow chart of FIG. 3, upon receiving the e-mail, each recipient may enable (by any appropriate method such as double-clicking on the URL) the pointer 302 and the Web site holding the attachment will be automatically called and presented to the recipient 304. Thus, a recipient can link and view Web pages directly from the e-mail message by double-clicking on the URL in the message. The recipient has clickable, instant access to the Web from the e-mail message without having to exit and launch a different interface. The invention creates an active hyperlink for the URLs on the spot. By double-clicking on a URL, the browser is loaded, and the Web page is automatically called.

When a recipient desires to access the attachment, a check is made to confirm that the recipient is on the access list 306. If the recipient is not on the access list, access is denied 308. If the recipient is on the access list, access is provided 310. After reading the attachment, the recipient is deleted from the access list 312. Such deletion from the access list may occur at the instruction of the recipient or may occur automatically after the first access (in read only mode) of the attachment. Preferably only the originator of the message and the intended recipients have access to the access list, and preferably the only operation recipients may do is delete themselves from the list. Once the access list goes to null (i.e., all the intended recipients are deleted from the access list), the attachment is deleted (i.e., removed) from the server 314, 316

Step 312 may be alternatively configured such that a recipient is not automatically deleted from the access list subsequent to completion of access to the attachment. Moreover, steps 314 and 316 may be configured in other ways to meet the needs and preferences of a system administrator. For example, the access list may use an index to conserve address space on the server. The index considers factors such as size and age of an attachment to determine whether, or for how long, the attachment shall remain on the server. This may be useful under a number of scenarios, such as when a long period of time has passed and the access list has not been brought to null (e.g., at least one intended recipient has not yet accessed the attachment). To prevent unnecessary occupation of valuable server address space, the index may require that if certain predetermined criteria are met, the attachment is deleted from the server.

Figure 4:
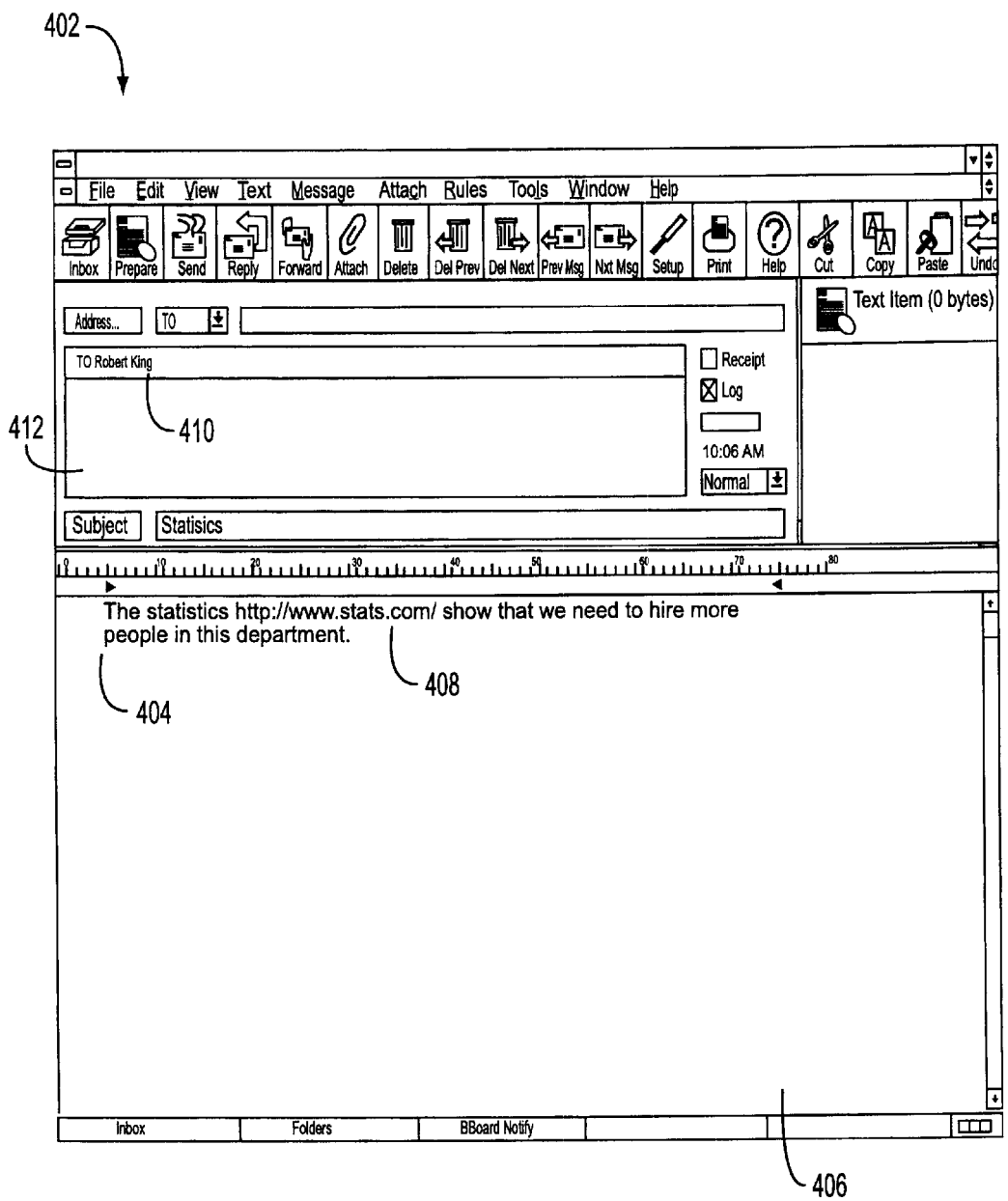
FIG. 4 is a computer screen diagram of an e-mail message with a pointer to a remote site containing an attachment, created according to a preferred embodiment of the invention.

A computer screen 402 of an e-mail message prepared according to a preferred embodiment of the present invention is shown in FIG. 4. The text 404 of the message is in the message text window 406. Embedded in the text is a pointer 408, which identifies and is linked to a remotely located attachment. The pointer 408 may be located in any part of the text window 406. Rather than referencing to a dynamic set of data, the pointer captures the attachment at the moment of time that the originator of the message wants the recipient to see. The attachment may be a spreadsheet, bitmap graphics, a CAD drawing, a sound file, an executable program or other formatted document. The pointer 408 may be a URL as shown in FIG. 4. The recipient 410, listed in the address window 412, may double-click on the embedded URL 408, thereby creating an active link to the Web page that holds the attachment. The recipient does not have to exit its e-mail application and launch a separate application for connecting to the Web.

The invention provides a hybrid push and pull system. The information that the originator wants to push to the recipient is referenced to by the pointer. Rather than automatically providing the recipient with the information, the recipient must enable the pointer to pull the referenced information. The invention thus applies the benefits of both push and pull technologies to provide a messaging system that does not overwhelm the network and efficiently manages the transfer and sharing of information among a plurality of users. This more closely mimics how information is shared.

In another embodiment of the invention, a sender of a message may define the access rights of the remotely-located attachments. For example, access may be limited to only those recipients of the e-mail message. The rights may include read only; read and save only; read, write and save only; and the like. The attachments may also be subject to access control rights designated by entities other than the sender of the message.

Another embodiment of the invention provides a work flow arrangement. This enables recipients of an electronic message to read, revise, edit, supplement and alter the attachment that is located on a remote site. This allows a plurality of recipients to work together on a document or other type of attachment in a team-work fashion.

Another embodiment of the invention allows the access list to be modified. For example, a recipient may be added if certain modification rules are met. The modification rules include, for example, whether additional employees are hired, whether additional employees are assigned to a project, whether an intended recipient desires additional individuals to view the attachment, and the like.

The access list may also be modified according to organizational structure rules. Organizational structure rules allow business tasks to be accomplished in an uninterrupted and efficient manner. Organizational structure rules may be based on organizational hierarchies, job responsibilities, functional roles, delegation requirements, information consolidation needs, work flow requirements and other enterprise-driven factors. For example, an individual may desire that his or her administrative assistant or other co-worker also have access to any attachments in which he or she is provided access. Alternatively, rather than providing such access to all e-mail messages having attachments, a restriction may be placed on the type of e-mail message or attachment. For example, access may depend on identity of the originator of the message, subject of the message, date of the message or other configurable criteria.

Another example is to provide access to attachments if the intended recipient of the attachment is on vacation or is otherwise unable to receive the message. Response to an e-mail may be time sensitive, and this provision of access remedies problems that may arise from unanswered messages.

Consolidation of information also may be accomplished by providing information to a certain group of individuals. For example, if a supervisor ordinarily does not receive sales updates, but individuals working for the supervisor do, the access list may be modified such that the supervisor receives sales updates any time that those particular individuals receive the updates. Finally, the organizational structure rules may be designed such that access reflects the enterprise's work flow patterns.

Another embodiment of the invention allows the deletion criteria for the attachment to be configurable. Rather than having the attachment be deleted upon the access list becoming null, the administrator or originator of the message may establish other criteria for determining when an attachment should be deleted from a server. For example, there may be a configured lifetime for the attachment. If recipients do not access the attachment within, say, thirty days, the attachment is deleted. Additionally, rules may be established that allow recipients to access the attachment as many times as desired until the attachment is deleted.

Another embodiment of the invention provides the capability of recapturing the history of what electronic messages and corresponding remotely-located attachments have been sent.

Another embodiment of the invention controls the transfer of documents across a network. There may be certain documents that are designated as confidential, or otherwise have content-driven restrictions on the community of intended recipients. An originator of a message may not want such documents to flow across the network. The delivery of such documents therefore can be blocked. The criteria for controlling such transfer flow is configurable to meet the preferences and needs of the administrator or originator. Optionally, confidential documents may be viewed by recipients only if they first go through a secure sockets layer or other security mechanism.

Other embodiments and uses of the invention will be apparent to those skilled in the art from consideration of the specification and practice of the invention disclosed herein. The specification should be considered exemplary only, with the true scope and spirit of the invention indicated by the following claims.

I claim:

1. An apparatus for automated referencing of electronic information comprising:

means for receiving a message, said message having at least one attachment;

means for determining whether said at least one attachment has been designated as restricted for security purposes;

means for applying detachment rules to said message if said at least one attachment has been designated as restricted for security purposes, said detachment rules including criteria for detachment;

detachment means for detaching said attachment if said detachment rules determine that said attachment should be detached;

placement means for placing said attachment on a remote site, said placement means being responsive to said detachment means;

pointer means for placing a pointer in said message, wherein said pointer is linked to said remote site, said pointer means being responsive to said placement means:

means for sending said message to at least one recipient; and means for enabling said at least one recipient to modify said at least one attachment placed on the remote site while said at least one attachment is accessed from said remote site and wherein a user may view said at least one attachment being modified.

2. The apparatus of claim 1, wherein said pointer is a uniform resource locator.

3. The apparatus of claim 1, wherein said remote site is located on a World Wide Web server.

4. The apparatus of claim 1, further comprising means for creating an access list, wherein said access list defines access rights to said attachment, said access list comprising a user list identifying at least one user and user access rights assigned to each said user.

5. The apparatus of claim 4, wherein said user list identifies each said at least one recipient.

6. The apparatus of claim 4, wherein said access list is modified responsive to application of modification rules.

7. The apparatus of claim 4, wherein said access list is modified responsive to application of organizational structure rules.

8. The apparatus of claim 4, wherein enablement of said pointer by said at least one user automatically links said at least one user to said attachment.

9. The apparatus of claim 4, further comprising means for allowing said at least one user to alter said attachment.

10. The apparatus of claim 4, wherein said attachment is removed from said remote site when said user list is emptied.

11. The apparatus of claim 1, wherein said attachment is removed from said remote site in response to application of predetermined deletion criteria.

12. A method for automated referencing of electronic information comprising the steps of:

receiving a message, said message having at least one attachment;

determining whether said at least one attachment has been designated as restricted for security purposes;

applying detachments rules to said message if said attachment has been designated as restricted for security purposes, said detachment rules including criteria for detachment;

sending said message to at least one recipient detaching said attachment if said detachment rules determine that said attachment should be attached;

placing said attachment on a remote site, said placing step being responsive to said detaching step;

inserting a pointer into said message, wherein said pointer is linked to said remote site, said inserting step being responsive to said placing step; and enabling said at least one recipient to modify said attachment placed on the remote site while said attachment is accessed from said remote site and wherein a user may view said attachment being modified.

13. A computer usable medium having computer readable code embodied therein for automated referencing of electronic information in a computer system, the medium comprising:

computer readable code that causes a computer to receive a message, the message having at least one attachment;

computer readable code that causes a computer to determine whether the at least one attachment has been designated as restricted for security purposes;

computer readable code that causes a computer to apply detachment rules to the message if the at least one attachment has been designated as restricted for security purposes, the detachment rules including criteria for detachment;

computer readable code that causes a computer to detach the at least one attachment if the detachment rules indicate that the at least one attachment should be detached:

computer readable code that causes a computer to place the at least one attachment detached on a remote site;

computer readable code that causes a computer to insert a pointer in the message;

computer readable code that causes a computer to send the message to at least one recipients;

computer readable code that causes a computer to enable the at least one recipient to modify the at least one attachment placed on the remote site while the at least one attachment is accessed from said remote site and wherein a user may view the at least one attachment as the at least one attachment is being modified.

14. The computer usable medium of claim 13, wherein the remote site is a site on the Internet, an intranet, a local area network, and a wide area network.

15. The computer usable medium of claim 13, wherein the pointer is a Uniform Resource Locator providing an active hyperlink allowing a message recipient to automatically access the detached at least one attachment.

16. The computer usable medium of claim 13 further comprising computer readable code for permitting only the message recipient means to access the detached at least one attachment located at the remote site.

17. An apparatus for automated referencing of electronic information comprising:

a receiving object that receives a message, the message having at least one attachment;

a determining object that determines whether the at least one attachment has been designated as restricted for security purposes;

a detachment rules applying object that applies detachment rules to the message if the attachment has been designated as restricted for security purposes, the detachment rules including criteria for detachment;

a detaching object that detaches the attachment if the detachment rules applying object determines that the attachment should be detached;

an attachment placing object that places the attachment on a remote site the attachment placing object being responsive to the detaching object;

a pointer placing object that places a pointer in the message, wherein the pointer is linked to the remote site, the pointer placing object being responsive to the placing object;

a sending object that sends the message to at least one recipient; and a modifying object that enables the at least one recipient to modify the attachment placed on the remote site while the attachment is accessed from the remote site and wherein a user may view the attachment as the attachment is being modified.

18. The apparatus of claim 17, wherein the pointer is a uniform resource locator.

19. The apparatus of claim 17, further comprising an access list creating object that creates an access list that defines access rights to the attachment, the access list comprising a user list identifying at least one user and user access rights assigned to each user.

\* \* \* \* \*

UNITED STATES PATENT AND TRADEMARK OFFICE
CERTIFICATE OF CORRECTION

| | |
|---|---|
| PATENT NO. | : 6,275,848 B1 |
| APPLICATION NO. | : 08/861022 |
| DATED | : August 14, 2001 |
| INVENTOR(S) | : Gordon K. Arnold |

It is certified that error appears in the above-identified patent and that said Letters Patent is hereby corrected as shown below:

Claim 12, Column 7, Line 57, please delete the word "attached" and insert -- detached --.

Signed and Sealed this

Ninth Day of January, 2007

JON W. DUDAS
*Director of the United States Patent and Trademark Office*